(12) United States Patent
Khemani et al.

(10) Patent No.: US 8,697,245 B2
(45) Date of Patent: *Apr. 15, 2014

(54) MOULDABLE BIODEGRADABLE POLYMER (75) Inventors: Kishan Khemani, Williamstown (AU);
Nicholas John McCaffrey, Burwood (AU); Rulande Henderson, Hoboken, NJ (US)

(73) Assignee: Plantic Technologies Ltd., Altona, Victoria (AU)

( * ) Notice: Subject to any disclaimer, the term of this patent is extended or adjusted under 35 U.S.C. 154(b) by 987 days.

This patent is subject to a terminal disclaimer.

(21) Appl. No.: 12/376,169

(22) PCT Filed: Aug. 6, 2007

(86) PCT No.: PCT/AU2007/001103
§ 371 (c)(1),
(2), (4) Date: Jul. 14, 2009

(87) PCT Pub. No.: WO2008/014573
PCT Pub. Date: Feb. 7, 2008

(65) Prior Publication Data
US 2010/0297458 A1 Nov. 25, 2010

(30) Foreign Application Priority Data
Aug. 4, 2006 (AU) ................................ 2006904239

(51) Int. Cl.
*B32B 27/18* (2006.01)
*B32B 27/22* (2006.01)
*B32B 27/36* (2006.01)
*C08L 3/12* (2006.01)
*C08L 3/14* (2006.01)
*C08L 29/02* (2006.01)
*C08L 29/04* (2006.01)
*C08L 67/02* (2006.01)
*C08L 67/04* (2006.01)
*C08K 5/053* (2006.01)
*C08G 63/16* (2006.01)
*C08G 63/183* (2006.01)

(52) U.S. Cl.
USPC ............ 428/480; 428/532; 524/47; 524/379; 524/386; 524/389; 525/56; 525/63; 525/165; 525/173; 525/174; 528/302; 528/308; 528/308.6; 528/308.7

(58) Field of Classification Search
None
See application file for complete search history.

(56) References Cited

U.S. PATENT DOCUMENTS

| 3,949,145 | A | * | 4/1976 | Otey et al. ................. 428/424.6 |
| 5,258,810 | A | * | 11/1993 | Bresina et al. .................. 399/72 |
| 5,288,765 | A | | 2/1994 | Bastioli et al. |
| 5,334,634 | A | * | 8/1994 | Bastiolo et al. ................. 524/47 |
| 5,362,778 | A | * | 11/1994 | Famili et al. .................... 524/50 |
| 5,384,187 | A | * | 1/1995 | Uemura et al. ................. 442/59 |
| 5,462,982 | A | * | 10/1995 | Bastioli et al. .................. 524/47 |
| 5,569,692 | A | * | 10/1996 | Bastioli et al. .................. 524/47 |
| 5,693,786 | A | * | 12/1997 | Tanaka et al. ................. 536/107 |
| 5,719,214 | A | * | 2/1998 | Tanaka et al. .................. 524/47 |
| 5,756,194 | A | * | 5/1998 | Shogren et al. ............ 428/312.4 |
| 5,844,023 | A | * | 12/1998 | Tomka ............................ 524/47 |
| 6,025,417 | A | | 2/2000 | Willett et al. |
| 6,231,970 | B1 | * | 5/2001 | Andersen et al. ............. 428/332 |
| 6,730,724 | B1 | * | 5/2004 | Bastioli et al. .................. 524/47 |
| 6,821,590 | B2 | * | 11/2004 | Verrall et al. ................ 428/35.7 |
| 6,830,810 | B2 | * | 12/2004 | Bond .............................. 428/373 |
| 7,153,354 | B2 | * | 12/2006 | Narayan et al. ............. 106/207.1 |
| 7,176,251 | B1 | * | 2/2007 | Bastioli et al. .................. 524/47 |
| 7,326,743 | B2 | * | 2/2008 | Yu et al. .......................... 524/47 |
| 7,495,044 | B2 | * | 2/2009 | Long et al. ...................... 524/47 |
| 7,629,405 | B2 | * | 12/2009 | Narayan et al. ................ 524/445 |
| 7,740,952 | B2 | * | 6/2010 | Hausmann et al. ........... 428/522 |
| 7,854,994 | B2 | * | 12/2010 | Henderson-Rutgers et al. ............................. 428/480 |
| 8,193,300 | B2 | * | 6/2012 | Bastioli et al. ................ 528/302 |
| 2004/0242732 | A1 | * | 12/2004 | Yu et al. .......................... 524/50 |
| 2006/0008605 | A1 | * | 1/2006 | Boswell et al. .............. 428/35.7 |
| 2006/0293419 | A1 | * | 12/2006 | Yu et al. .......................... 524/47 |
| 2007/0148383 | A1 | * | 6/2007 | Long et al. ................... 428/35.5 |
| 2007/0276317 | A1 | * | 11/2007 | Henderson et al. ............. 604/15 |
| 2008/0147034 | A1 | * | 6/2008 | Wang et al. ................... 604/370 |
| 2009/0312462 | A1 | * | 12/2009 | Oakley et al. ................... 524/47 |

FOREIGN PATENT DOCUMENTS

| DE | 19648616 A1 | | 5/1998 |
|---|---|---|---|
| EP | 0842977 A2 | | 5/1998 |
| JP | 07-097545 | * | 4/1995 |
| WO | 93/20140 A1 | | 10/1993 |
| WO | 94/12567 A1 | | 6/1994 |
| WO | 02/074352 A1 | | 9/2002 |
| WO | WO 2006/037157 | * | 4/2006 |
| WO | WO 2006/042364 | * | 4/2006 |

OTHER PUBLICATIONS

"Glycerol" entry on Wikipedia (http://en.wikipedia.org/wiki/Glycerol) (retrieved Aug. 27, 2012).*
"Erythritol" entry on Wikipedia (http://en.wikipedia.org/wiki/Erythritol) (retrieved Aug. 27, 2012).*
"Xylitol" entry on Wikipedia (http://en.wikipedia.org/wiki/Xylitol) (retrieved Aug. 27, 2012).*
"Sorbitol" entry on Wikipedia (http://en.wikipedia.org/wiki/Sorbitol) (retrieved Aug. 27, 2012).*
"Maltitol" entry on Wikipedia (http://en.wikipedia.org/wiki/Maltitol) (retrieved Aug. 27, 2012).*
Supplementary European Search Report issued in corresponding European Patent Application No. 07784743 dated Jan. 16, 2012 (1 page).
Wikipedia,"Amylose," http://en.wikipedia.org/wiki/Amylose, retrieved Feb. 20, 2013, 4 pages.
Singh, N. et al., "Morphological, thermal and rheological properties of starches . . . ," Food Chemistry, 81, 2003, 219-231.

* cited by examiner

*Primary Examiner* — Vivian Chen
(74) *Attorney, Agent, or Firm* — Kilyk & Bowersox, P.L.L.C.

(57) ABSTRACT

A biodegradable injection mouldable polymer composition including on a dry weight basis from 45-85% w/w by weight of a starch and/or a modified high amylose starch, from 2-15% w/w by weight of a water soluble polymer preferably selected from polyvinyl alcohol, polyvinyl acetate and copolymers of ethylene and vinyl alcohol which have a melting point compatible with the molten state of the starch components, and from 5-45% w/w by weight of one or more polyol plasticizers having a molecular weight in the range of 50-6000, more preferably 50-2500, and still more preferably 100-400 and preferably selected from the group consisting of sorbitol, glycerol, maltitol, xylitol, mannitol, erythritol, polyglycerol, glycerol trioleate, tributyl citrate, acetyl triethyl citrate, glyceryl triacetate, 2,2,4-trimethyl-1,3-pentanediol diisobutyrate, polyethylene oxide, ethylene glycol, diethylene glycol or polyethylene glycol; more preferably glycerol, maltitol, sorbitol, erythritol and xylitol. The composition is preferably substantially soluble in water.

30 Claims, 2 Drawing Sheets

MOULDABLE BIODEGRADABLE POLYMER

This application is a National Stage Application of International Application No. PCT/AU2007/001103, filed Aug. 6, 2007, which claims priority from Australian Patent Application No. 2006904239, filed Aug. 4, 2006.

This invention relates to improvements in biodegradable polymeric products particularly injection mouldable starch based polymers. In particular this invention relates to resin formulations suited to use in injection moulding applications which have variable mechanical properties according to need and improved environmental performance. The invention also relates to the processes for preparing such resins and products made from them.

BACKGROUND TO THE INVENTION

There is an increasing demand for many plastic products to be biodegradable.

Biodegradable polymers based on starch are known and inexpensive but generally possess high viscosities and poor melt properties that make them consequently difficult to process. Products made from starch are often brittle and water sensitive. Difficulties have been encountered in producing starch based polymers particularly for injection moulding. The molecular structure of the starch is adversely affected by the shear stresses and temperature conditions needed to plasticise the starch and pass it through an extrusion die. For most products foaming has to be avoided and this generally requires attention because of the water content of the starch. Foaming has been avoided by degassing the melt prior to exiting the die as suggested in U.S. Pat. Nos. 5,314,754 and 5,316,578. The latter patent also avoids adding water to the starch. As explained in U.S. Pat. No. 5,569,692 by not drying starch and avoiding the addition of water the starch can be processed at temperatures between 120° C. and 170° C. because the water bound to the starch does not generate a vapour pressure such as to require high pressures.

Another approach to improving the melt processability of starch is to provide an additive as in U.S. Pat. No. 5,362,777 which reduces the melting point of the starch. The additive is selected from dimethyl sulfoxide, a selection of polyols and amino or amide compounds.

U.S. Pat. No. 5,043,196 discloses a high amylose starch for injection moulding.

U.S. Pat. No. 5,162,392 discloses an injection mouldable corn starch and LDPE biodegradable polymer.

In order to produce starch polymers for particular applications they have been blended with a range of other polymers. Biodegradable blown films are disclosed in U.S. Pat. No. 5,322,866 which blends raw starch, polyvinyl alcohol and talc with glycerol and water. U.S. Pat. No. 5,449,708 discloses compositions of starch ethylene acrylic acid and a salt of stearic acid plus a glycerol based lubricant. Flexible and clear transparent sheets are disclosed in U.S. Pat. No. 5,374,304. These are composed of a high amylose starch and a glycerol plasticizer. The use of starch in conjunction with high amylose or modified starches has also been proposed. U.S. Pat. Nos. 5,314,754 and 5,316,578 both suggest the use of modified starches including hydroxypropyl substituted starches. Hydroxypropylation reportedly increases elongation at break and burst strength and improved resilience in the polymers.

International application WO00/36006 discloses biodegradable water soluble formulations using a major amount of modified starch and a minor amount of a water soluble poly vinyl alcohol. These formulations are thermo formable but there are no examples of injection mouldable compositions.

The foregoing discussion of the prior art shall not be understood to be equivalent to an acknowledgement of the general state of knowledge in the field of biodegradable injection mouldable polymer compositions.

It is an object of this invention to provide injection mouldable biodegradable polymer compositions which can be readily processed at higher melt processing temperatures for good flow but which have low moisture content so as to avoid bubbling and discolouration during processing and acceptable properties for their intended use.

BRIEF DESCRIPTION OF THE INVENTION

The present invention provides a biodegradable injection mouldable polymer including on a dry weight basis:

a) from 45-85% w/w by weight of a starch and/or a modified high amylose starch b) from 2-15% w/w by weight of a water soluble polymer preferably selected from polyvinyl alcohol, polyvinyl acetate and copolymers of ethylene and vinyl alcohol which have a melting point compatible with the molten state of the starch components, c) from 5-45% w/w by weight of one or more polyol plasticizers having a molecular weight in the range of 50-6000, more preferably 50-2500, and still more preferably 100-400 and preferably selected from the group consisting of sorbitol, glycerol, maltitol, xylitol, mannitol, erythritol, polyglycerol, glycerol trioleate, tributyl citrate, acetyl triethyl citrate, glyceryl triacetate, 2,2,4-trimethyl-1,3-pentanediol diisobutyrate, polyethylene oxide, ethylene glycol, diethylene glycol or polyethylene glycol; more preferably glycerol, maltitol, sorbitol, erythritol and xylitol.

Optionally the compositions may include 0.5-60% w/w filler selected so as to define desirable mechanical properties including mechanical and environmental performance.

Optionally, the polymer compositions may also include on a dry basis 0.1-5.0% w/w of one or more $C_{12-22}$ fatty acids or salts.

Further, the compositions may also optionally include 0.2-3.0% w/w emulsifier having a hydrophilic lipophilic balance (HLB) value between 1 and 22.

The compositions may also include 4-45% w/w polyester grafted or ungrafted to the starch backbone.

The compositions defined are suitable for forming injection moulded products and are characterised by the variability of their mechanical properties through combinations of plasticiser and filler, and their environmental performance through the choice of co polymer and water resistant additives. Desirably they have properties including a tensile modulus ranging from 50 MPa to above 2500 MPa and an elongation at break of 2% to more than 200%. Preferably the compositions are substantially soluble in water.

There is also provided an injection moulded product formed from a resin composition including on a dry weight basis:

a) from 45-85% w/w by weight of a starch and/or a modified high amylose starch b) from 2-15% w/w by weight of a water soluble polymer preferably selected from polyvinyl alcohol, polyvinyl acetate and copolymers of ethylene and vinyl alcohol which have a melting point compatible with the molten state of the starch components, c) from 5-45% w/w by weight of one or more polyol plasticizers having a molecular weight in the range of 50-6000, more preferably 50-2500, and still more preferably 100-400 and preferably selected from the group consisting of sorbitol, glycerol, maltitol, xylitol, mannitol, erythritol, polyglycerol, glycerol trioleate, tributyl citrate, acetyl triethyl citrate, glyceryl triacetate, 2,2,4-trimethyl-1,3-pentanediol diisobutyrate, polyethylene oxide, ethylene glycol, diethylene glycol or polyethylene glycol; more preferably glycerol, maltitol, sorbitol, erythritol and xylitol.

Optionally the compositions from which the products are formed may include 0.5-60% w/w filler selected so as to define desirable mechanical properties including mechanical and environmental performance.

Optionally, the polymer compositions from which the products are formed may also include on a dry basis 0.1-5.0% w/w of one or more C12-22 fatty acids or salts.

Further, the compositions from which the products are formed may also optionally include 0.2-3.0% w/w emulsifier having a hydrophilic lipophilic balance (HLB) value between 1 and 22. Preferably the injection moulded products formed from the resin compositions are substantially soluble in water.

DETAILED DESCRIPTION OF THE INVENTION

The amount of starch, modified and/or unmodified, in the composition is limited by the required addition levels of all the other components: it makes up the balance. The starch may be derived from wheat, maize, potato, rice, oat, arrowroot, and pea sources. One preferred source is maize (corn) starch. Unmodified starch is a cheap biodegradable raw material from renewable resources that may contribute to the barrier properties of the final product and is therefore highly attractive for this application. However, its use is limited by the occurrence of retrogradation (crystallisation resulting in brittleness), limited optical clarity of the resulting formed products, limited film-forming properties and limited elasticity for stretching. One preferred concentration range for unmodified starch as a fraction of the total amount of starch is 0 to 50% although levels up to 100% may be possible.

The upper limit to the content of the modified starch is largely determined by its cost. This component contributes structural benefits to the resulting material including good cohesive and elongational properties, good optical properties, and resistance to retrogradation. The term retrogradation has been applied to describe the return to crystallinity by the starch components during storage after the heating and cooling operations. This process is what is generically referred to as staling and explains the hardening (or stiffening) of starch-based foods during extended storage. Hydroxypropylation helps to inhibit crystallinity. Typical modified starches include those having an hydroxyalkyl $C_{2-6}$ group or starch modified by reaction with an anhydride of a dicarboxylic acid. A preferred component is hydroxypropylated amylose. Other substituents can be hydroxyethyl, hydroxypropyl, hydroxybutyl, to form hydroxyether substitutions, acetylated starches or anhydrides such as maleic phthalic or octenyl succinic anhydride can be used to produce ester derivatives. The degree of substitution (the average number of hydroxyl groups in a unit that are substituted) is preferably 0.05 to 2. The preferred starch is a high amylose maize (corn) starch, more preferably a hydroxypropylated high amylose starch. A preferred component is a hydroxypropylated high amylose starch. Typical values are 6.1 to 6.9%.

For cost savings and for property optimisation reasons one may substitute part of this starch with:
1) higher or lower levels of hydroxypropylated starch
2) a higher level of unmodified starch. This may be possible in particular if the level of hydroxypropylation of the modified starch is increased;
3) a starch modified with octenyl succinic anhydride (OSA), which has a higher degree of hydrophobicity. The addition of this modified starch increases water resistance with increasing degree of substitution. The acetyl linkages in the OSA starch ensure that the material retains biodegradability upon access to water and a biologically active environment.
4) a starch co-polymer, preferably consisting of a styrene butadiene grafted with starch. This material improves impact resistance of the product.

The moisture content (wet basis) can be between 0 to 15%, with lower moisture content allowing processing at higher melt temperatures without complications caused by loss of water at these temperatures. Unmodified starch is a cheap biodegradable raw material from renewable resources that contributes to the barrier properties of the final product, therefore highly attractive for this application. However, its use is limited by the occurrence of retrogradation (crystallisation resulting in brittleness), limited optical clarity of the resulting formed products, limited film-forming properties and limited elasticity for stretching. High-amylose starch is less sensitive to retrogradation (because it is found to be predominantly associated with the crystallization of Amylopectin within the cooked starch). A preferred concentration range for unmodified starch as a fraction of the total amount of starch is 0 to 50%.

The polymer component b) of the composition is preferably compatible with starch, water soluble, biodegradable and has a low melting point compatible with the processing temperature/s of the starch or starches selected. Water solubility of the selected polymer should preferably not occur at room temperature conditions. Copolymers such as PVOH may be used to improve the stiffness and water resistance of the polymers. Water soluble polymers are compatible with the starch. Increasing the molecular weight or increasing the level of the copolymer improves the water resistance. Varying the hydrolysis level of the PVOH or using EVA or EVOH copolymers can be used to improve the water resistance. Biodegradable polyesters increase the water resistance, leading to materials with controlled water resistance for less than 1 day at 10% polyester to greater than 12 weeks at 40% polyester. Copolymer blends can improve the water resistance by forming water resistant micro-domains within the starch matrix, making a more tortuous path for water diffusion. The micro-structure of the blend is determined by the compatibility between the starch and the polyester (solubility parameter) and the viscosity difference between the polyester phase and the starch phase. At the extreme (very high viscosity Thermoplastic Starch (TPS) with low viscosity polyester) the polyester forms a water resistant skin around a high molecular weight starch core. Linear, aliphatic polyesters are more compatible with the starch than aromatic or aliphatic-aromatic polyesters. The polyesters need not be grafted to the starch, but are not fully compatible with starch, and so compatibility can be improved by grafting the polyester onto the starch backbone such as is described in Maliger et al, Compatabilization of STARCH POLYESTER BLENDS USING REACTIVE EXTRUSION, Polymer Engineering & Science—2006, Wiley InterScience. One such suitable polyester is EnPol, a biodegradable polyester available from Ire Chemical Ltd. Preferably the EnPol grades used in the present invention are EnPol G8060 polybutylene adipate-co-terephthalate (PBAT) and EnPol G4560 polybutylene adipate succinate (PBAS). Where such a polyester is present, grafted or ungrafted to the starch backbone, it may be present in amounts of 5-45% w/w.

Polyvinyl alcohol is one preferred polymer but polymers of ethylene-vinyl alcohol, ethylene vinyl acetate or blends with polyvinyl alcohol may also be used. PVOH offers a combination of excellent film forming and binder characteristics, good elasticity and aids processing of starch-based formulations. PVOH (Polyvinyl Alcohol) is produced by the hydrolysis of polyvinylacetate which is made by the polymerization of vinyl acetate monomer. The fully hydrolyzed grades contain few, if any, residual acetate groups; while partially hydrolyzed grades retain some of the residual acetate groups. Fully hydrolyzed grades dissolve in hot (200° F.) water, and remain in solution when cooled to room temperature. Preferred grades of PVOH include those having weight average molecular weight in the range of 90,000-112,000 and intrinsic viscosity in the range 20-70mPa.s Suitable copolymers include DuPont Elvanol 71:30, Elvanol 70:62, Elvanol 52:22 EVOH and Eval F104. The higher molecular weight grade appears to reduce brittleness, improve impact resistance and reduce water sensitivity. The maximum level is mainly determined by costs. Increasing the level of PVOH significantly increases elongation at break and decreases Young's modulus. A preferred concentration range for injection moulding material is 2-15% w/w %, more preferably, 4-10% w/w.

It has been found that a high level of a single plasticiser can lead to incomplete mixing of the plasticiser with the starch and possible re-crystallisation leading to migration of the plasticiser to the surface (blooming). Therefore a combination of plasticisers is preferred to achieve a higher total plasticisation level while keeping the individual components below a maximum level which lead to undesired characteristics such as those described.

The polyol plasticisers used have a range of molecular sizes and hydroxy groups that allow different degrees of association with starch after gelatinisation. The type and level of plasticiser used has a dramatic effect on the physical properties of the final thermoplastic starch polymer. Higher molecular weight plasticisers such as maltitol increase the modulus and decrease the elongation at break. Some plasticisers such as erythritol result in a desirable improvement in flexibility and increase the elongation at break. Glycerol is very volatile and may be lost during drying or processing. Some plasticisers such as sorbitol, erythritol and mannitol readily re-crystallise and may migrate within the polymer and move to the surface causing bloom. A combination of plasticisers is needed to achieve the balance of properties required in the final material with these detrimental side effects. It has been found that higher levels of plasticiser generally tend to decrease the modulus and increase the elongation at break. Unplasticised TPS polymers have a very high modulus (>2500 MPa) but are unable to be processed by conventional means. It appears that a minimum level of plasticiser (water or polyol) is required in order to process the material as sheet, film or moulded part.

The highest modulus obtained with injection mouldable materials plasticised with polyols is ~1000 MPa, with a minimum plasticiser level of about 20%. The preferred plasticiser is a mixture of polyols, in particular one or more other polyols particularly maltitol, glycerol, sorbitol, erythritol and xylitol. The plasticizer plays a triple role: it provides suitable rheology for the extrusion compounding process and for the injection moulding process whilst also positively affecting the mechanical properties of the product. Cost, food-contact or skin/mucosal membrane contact are important issues in choosing the appropriate plasticizer. Processing performance, mechanical properties and shelf life of the end product depend on the exact composition of the polyol mixture. At zero or very low water content, the plasticizer content is preferably 5% to 45%, more preferably 15-35%. Dependent on the type of plasticizer(s) used, the equilibrium moisture content of the injection moulded product, as measured by standard moisture balance method, is around 2-5%.

Sorbitol, Maltitol and Glycerol blends are particularly suitable for modifying the mechanical properties of the formulation, as is xylitol and blends of xylitol with sorbitol and glycerol. Sorbitol and xylitol are particularly good humectants. However, when using glycerol in particular below a certain threshold, an anti-plasticisation may occur, where due to the temporary increased mobility of the polymer chains due to the presence of the plasticiser, crystallisation or at least a high degree of ordering may occur causing an increased stiffness and brittleness of these formulations compared to the un-plasticised starch formulation. Furthermore crystallisation is observed when sorbitol is used on its own. Some polyols (sorbitol and glycerol in particular) may exhibit migration to the surface, where either an opaque crystalline film may form in the case of sorbitol, or an oily film in the case of glycerol. Blending various polyols inhibits this effect to varying degrees. Stabilisation may be enhanced with the addition of glycerol monostearate and sodium stearoyl lactylate as emulsifiers. Furthermore, synergistic effects with salt result in stronger effects on mechanical properties.

Water is present during the compounding process to ensure appropriate starch gelatinization. Excess water may be removed during compounding by means of venting or on/off line pellet drying, and may be further regulated to desired levels prior to injection moulding by means of e.g. hopper drying. The humectant properties of the selected blend of polyols will dictate the suitable and stable moisture content of the product. Depending on the polyol blend utilized, the plasticizer content is preferably 10 to 35% and the water content is 10 to 0%. For highly flexible injection moulding components the plasticizer content is preferably higher than for rigid injection moulding or sheet products.

Polyethylene oxide, polyoxyethylene and polyethylene glycol alternately or together may be used in the compositions to ensure that the composition is biocompatible and can be used in medical devices that have contact with mucosal tissues, including urine sample collectors and tampon applicators. The preferred polyethylene oxide is one having a molecular weight above 20,000. For medical applications the formulations must pass cytoxicity (ISO 10993-5), Sensitisation (ISO 10993-10) and Irritation (ISO 10993.10) tests. A preferred additive is Polyethylene oxide (PEG-5000 with a Mw of 210,000) added at 0.57% or 2% instead of stearic acid results in zero lysis in the cytoxicity test and when added at 5% in addition to stearic acid at 0.57% it also results in zero lysis. Polyethylene oxide, polyoxyethylene and polyethylene glycol alternately or together furthermore may provide an increased water resistance to the formulation thereby preventing excessive swelling which may result in delamination in particular in multi-layer structures (MLS).

One or more fatty acids and fatty acid salts may also be used as a lubricating agent in the composition because they show better compatability with starches than, for example, waxes. Stearic acid is hydrophobic and may therefore improve moisture sensitivity of the starch based material. As well as stearic acid, salts such as calcium stearate may be used. The amount of fatty acid and/or fatty acid salt used is preferably 0.1-5.0% w/w, more preferably 0.2-3.0% w/w. Sodium and potassium salts of stearic acid can also be used. Again cost can be a factor in the choice of this component but lauric, myristic, palmitic, linoleic and behenic acids are all suitable. Other processing aids such as euricamide may be used. The choice of processing aid is largely limited by the required resistance to delamination in MLS.

It is thought that starch may form complexes with fatty acids. The starch glucopyraniside (glucose) is a six-membered ring in the "chair" configuration. The perimeter of the ring is hydrophilic, while the faces are hydrophobic. The starch chain forms a helix, with about six residues per turn. The result is a hollow cylinder with a hydrophilic outer surface and a hydrophobic inner surface. The inner space is about 4.5 Å in diameter and straight chain alkyl molecules like stearic acid can fit into it. In the same manner, the fatty acid part of emulsifiers such as GMS can form a complex with gelatinized starch, retarding starch crystallization, thereby slowing the process of staling. The amount of monoglyceride that complexes with amylose (the linear component in starch) and with amylopectin (the branched component in starch), is dependent upon the degree of saturation of the fatty acid portion of the emulsifier. Unsaturated fatty acids have a bend produced by the double bond in the fatty acid chain that limits their ability to form a complex.

Where an emulsifier is present in the composition, and the application of the product is to the packaging of food, the emulsifier is preferably a food grade emulsifier. Typically the selection is dependent on the HLB (hydrophilic lipophilic balance) value. One or more preferred emulsifiers are selected from food grade emulsifiers with HLB numbers between 1 and 22 and include propylene glycol monostearate, glycerol monoleate, glycerol monostearate, acetylated monoglycerides (stearate), sorbitan monooleate, p-ropylene glycol monolaurate, sorbitan monostearate, calcium stearoxyl-2-lactylate, glycerol monolaurate, sorbitan monopalmitate, soy lecithin, diacetylated tartaric acid esters of monoglycerides, sodium stearoyl lactylate, sorbitan monolaurate. Sodium stearoyl lactylate and glycerol monostearate are commonly used in starch systems. Typical emulsifiers and their HLB values are shown in table 2. The preferred amount of emulsifier present is between 0.2-3.0% w/w.

TABLE 1

Hydrophobic/Hydrophilic Balance (HLB) Values for some Emulsifiers

| Emulsifier | HLB Value |
|---|---|
| Sodium Stearoyl Lactylate (SSL) | 21.0 |
| Polysorbate 80 (Sorbitan Monooleate) | 15.4 |
| Polysorbate 60 (Sorbitan Monostearate) | 14.4 |
| Sucrose Monostearate | 12.0 |
| Polysorbate 65 (Sorbitan Tristearate) | 10.5 |
| Diacetyl Tartaric Ester of Monoglyceride (DATEM) | 9.2 |
| Sucrose Distearate | 8.9 |
| Triglycerol Monostearate | 7.2 |
| Sorbitan Monostearate | 5.9 |
| Succinylated Monoglyceride (SMG) | 5.3 |
| Glycerol Monostearate (GMS) | 3.7 |
| Propylene Glycol Monoester (PGME) | 1.8 |

Glycerol monostearate is particularly suitable as it has a defoaming effect and anti retrodegradation effect in starch compositions. Added at levels ranging from 1-1.5% acts as an emulsifier to stabilise mechanical properties and increase homogeneity of the blend. Sodium stearoyl lactylate at 0.25% to 1.5% added to a plasticiser system further stabilizes mechanical properties and increases homogeneity of the blend. Stearoyl lactoylate (as the sodium or calcium salt) is also commonly used as a dough strengthener and may hence act as an anti-retrogradation agent. Combinations of glycerol monostearate and sodium stearoyl lactylate result in faster stabilisation of properties. The HLB value follows the additive rule and is of order 4 to 10 for a suitable mixture of SSL and GMS.

Antioxidants or reducing agents including sulfiting agents (sulfur dioxide, sodium sulfite, sodium and potassium bisulfites and metabisulfites) are added to many foods to prevent enzymatic and non-enzymatic browning and act in the compositions described herein in the same capacity. Sulfites inhibit non-enzymatic browning by reacting with carbonyl intermediates, thereby preventing their further reaction to form brown pigments. Citric acid, often in conjunction with ascorbic acid or sodium bisulfite, has long been used as a chemical inhibitor of enzymic browning. Octadecyl 3,5-Di-(tert)-butyl-4-hydroxyhydrocinnamate (Irganox) may also be added as an antioxidant. Tocopherol (Vitamin E) is also a natural stabiliser used in foods, and has been used in combination with Ascorbic Acid to improve the effectiveness in preventing non-enzymatic browning. One preferred concentration of antioxidant where browning is undesirable may up to 2% w/w.

Water is added for the purpose of "gelatinising" (also called destructurising or melting) the starch into a polymeric gel structure. Water also may act like a plasticiser in the end-product in that it softens the material or reduces the modulus. The moisture contents of the material may vary at water activities or relative humidities (RH) below 30% or superior to 75%. In many applications, the local RH to which the material is exposed may reach values of up to 90%. For stable mechanical, lamination properties and for ease of processing at all temperatures, non-volatile plasticisers are preferred. Therefore some or all of the water may be dried off during or after the compounding stage and/or in the feeding stage of the subsequent injection moulding or film forming. This may be achieved with venting the extruder barrel, and/or on-line drying of the pellets. Extrusion processing of unplasticised formulations is possible with water concentrations as low as 10% and formulations with polyol plasticisers may be dried to 0% free water before injection moulding. The preferred moisture content is the equilibrium moisture content of the formulation at the in-use RH range of the end product as determined by moisture sorption experiments. This depends on the specific composition but is in the range of 3-12%.

Fillers and particularly reinforcing fillers may be used to increase the stiffness of the plasticised material. A range of fillers is available. One or more fillers may be used depending on the characteristics required of the end product. Natural fibres or minerals are preferred as fillers, as they complement the environmental credentials of the starch polymers. A key parameter in selecting fillers is the aspect ratio of the filler. Higher aspect ratio fillers (such as wood flour and Wollastonite) have a higher reinforcing effect, leading to a higher stiffness but lower elongation to break. Other reinforcing fillers include silica, and silica based by-products of food processing (eg rice husks). Inert fillers, such as talc, can lead to softer materials with improved toughness. Natural fibres (sisal, jute, animal hair, oatmeal etc) as well as synthetic fibres can be used to increase stiffness, and can also improve water resistance. Chitin is a natural polysaccharide that has D-glucosamine as its repeating unit. Chitosan is a modified form of Chitin which is more easily handled and processed. Chitin is produced by a range of invertebrate animals, including prawns, crabs and squid. Chitin can act as both a reinforcing filler and also improves the water resistance of TPS. Other natural materials could also improve the water resistance (eg lignin), but would need to be modified to improve compatibility with starch. Other suitable fillers may include calcium carbonate, kaolin, clay and titanium dioxide, glass fiber, nanocomposites and nanoparticles which can be utilised for both reinforcing effect and for additional water resistance.. The filler may be present in amounts of 0.5-60% w/w, more preferably 20-50% w/w and still more preferably, 25-35% w/w.

The material is manufactured by means of extrusion compounding, using co- or counter-rotating twin screw or selected design single screw extruders. The preferable process is twin screw co-rotating compounding, with an extrusion pressure of at least 20 bar and with a screw speed of at least 100 RPM. Water may be added to the process (by means of liquid injection together with the plasticisers) dependent on the level and nature of other plasticisers. Removal of water may be carried out by means of convective drying for the extrudate strands, a centrifuge and a fluidised bed for granulate, or barrel venting or both. Granulate may be obtained by means of underwater pelletising, die face cutting or strand cooling and cutting.

A suitable process involves compounding and injection moulding in tandem, where the extrudate is accumulated in a shooting pot and injected into the mould. Here the injection moulder inlet moisture content is optimised for best processing conditions and minimal shrinkage.

If required, further drying of the injection moulded parts may occur in a drying tunnel, drum, or fluidised bed.

The material may be injection moulded using conventional screw driven or injection driven processes with hot or cold runner systems. The viscosity of the formulations given are comparable to typical thermoplastics processed by injection molding, eg LDPE & PP, at shear rates typical for the injection moulding process. This means that pressures for multi-cavity processing will be comparable to the conventional process.

In one embodiment of the present invention the injection moulded product can be partially or totally coated with a water resistant coating. Such coatings regulate the water resistance of the injection moulded product and, through the choice of coating and application of that coating, the water resistance of all or part of the injection moulded product can be established, Products so coated can solubilise in whole or part in a set period of time of anywhere between 30 minutes and 7 days Suitable coatings preferably include hydrophobic coatings including shellac, biodegradable polyester or PLA solutions either alternatively or in combination.

To illustrate how the formulations of this invention achieve properties specific for the application of this invention, the following examples set out in Table 2 were prepared.

The dry weight of components in the examples in Table 2 totals less than 100% as Table 2 does not include the processing aids such as emulsifiers and lubricating agents which were included in the example compositions. Processing aids which were incorporated into the example compositions included stearic acid, glycerol monostearate, sodium stearoyl lactylate and calcium stearate.

Examples 1-7 were trialled to determine the extent of any interaction between the plasticizers and the fillers.

Examples 5-7 demonstrate the use of reinforcing fillers. Examples 8-10 also demonstrate the effect of fillers on the mechanical properties of the end product.

Examples 10, 28 and 31 to 32 demonstrate the effect of co polymer additives and their level on the water resistance of the end products.

TABLE 2

| Dry weight | Example No | | | | | | | | | | | |
|---|---|---|---|---|---|---|---|---|---|---|---|---|
| | 1 % | 2 % | 3 % | 4 % | 5 % | 6 % | 7 % | 8 % | 9 % | 10 % | 11 % | 12 % |
| Starch | 62.60 | 31.30 | 37.60 | 48.20 | 48.70 | 48.70 | 48.70 | 48.10 | 67.20 | 41.60 | 56.20 | 65.20 |
| Glycerol | 0 | 0 | 0 | 8 | 4 | 4 | 4 | 4 | 5 | 3 | 5 | 5 |
| Sorbitol | 10 | 5 | 0 | 21.2 | 8 | 8 | 8 | 4 | 6 | 4 | 12 | 7 |
| Maltitol | 0 | 0 | 14 | 10.8 | 4 | 4 | 4 | 4 | 4 | 5 | 8 | 5 |
| Mannitol | 0 | 0 | 0 | 0 | 0 | 0 | 0 | 0 | 0 | 0 | 0 | 0 |
| Xylitol | 10 | 5 | 14 | 0 | 0 | 0 | 0 | 4 | 4 | 4 | 0 | 5 |
| Erythritol | 10 | 5 | 0 | 0 | 0 | 0 | 0 | 2 | 3 | 2 | 10 | 3 |
| PVOH | 6.2 | 3.1 | 3.7 | 10 | 8 | 8 | 8 | 6.6 | 8 | 13 | 6 | 7 |
| EnPol | 0 | 0 | 0 | 0 | 0 | 0 | 0 | 0 | 0 | 0 | 0 | 0 |
| Woodflour | 0 | 0 | 0 | 0 | 0 | 0 | 0 | 0 | 0 | 10 | 0 | 0 |
| Talc | 0 | 50 | 30 | 0 | 0 | 0 | 5 | 0 | 0 | 5 | 0 | 0 |
| Crystaline Silica | 0 | 0 | 0 | 0 | 0 | 25 | 20 | 0 | 0 | 10 | 0 | 0 |
| Amorphous Silica | 0 | 0 | 0 | 0 | 0 | 0 | 0 | 0 | 0 | 0 | 0 | 0 |
| Wollastonite | 0 | 0 | 0 | 0 | 25 | 0 | 0 | 25 | 0 | 0 | 0 | 0 |
| Chitin | 0 | 0 | 0 | 0 | 0 | 0 | 0 | 0 | 0 | 0 | 0 | 0 |
| PEO | 0 | 0 | 0 | 0 | 0 | 0 | 0 | 0 | 0 | 0 | 0 | 0 |
| PEG | 0 | 0 | 0 | 0 | 0 | 0 | 0 | 0 | 0 | 0 | 0 | 0 |
| Total Dry Mix | 98.80 | 99.40 | 99.30 | 98.20 | 97.70 | 97.70 | 97.70 | 97.70 | 97.20 | 97.60 | 97.20 | 97.20 |
| Modulus (Mpa) | | | 415 | | 2031 | 2580 | 1081 | 1250 | 1000 | 1360 | 123 | 839 |
| Elongation (%) | | | 51.6 | | 8.92 | 5.68 | 12.67 | 29.7 | 121 | 7.13 | 213 | 110 |

| Dry weight | Example No | | | | | | | | | | | |
|---|---|---|---|---|---|---|---|---|---|---|---|---|
| | 13 % | 14 % | 15 % | 16 % | 17 % | 18 % | 19 % | 20 % | 21 % | 22 % | 23 % | 24 % |
| Starch | 46.10 | 60.70 | 60.70 | 60.70 | 60.70 | 60.70 | 60.70 | 47.75 | 46.61 | 46.61 | 41.26 | 56.40 |
| Glycerol | 4 | 6 | 0 | 0 | 0 | 0 | 0 | 0 | 0 | 0 | 0 | 6 |
| Sorbitol | 5 | 6 | 7.5 | 7.5 | 10 | 10 | 10 | 8 | 8 | 8 | 8 | 8 |
| Maltitol | 5 | 6 | 7.5 | 7.5 | 10 | 10 | 0 | 4 | 4 | 4 | 4 | 6 |

TABLE 2-continued

| | | | | | | | | | | | | |
|---|---|---|---|---|---|---|---|---|---|---|---|---|
| Mannitol | 0 | 0 | 0 | 7.5 | 0 | 0 | 10 | 0 | 0 | 0 | 0 | 0 |
| Xylitol | 4 | 6 | 7.5 | 7.5 | 10 | 0 | 10 | 6 | 6 | 8 | 6 | 8 |
| Erythritol | 2 | 6 | 7.5 | 0 | 0 | 10 | 0 | 1 | 3 | 1 | 1 | 7 |
| PVOH | 6.5 | 6.5 | 6.5 | 6.5 | 6.5 | 6.5 | 6.5 | 6.5 | 6.34 | 6.34 | 13 | 6 |
| EnPol | 0 | 0 | 0 | 0 | 0 | 0 | 0 | 0 | 0 | 0 | 0 | 0 |
| Woodflour | 10 | 0 | 0 | 0 | 0 | 0 | 0 | 0 | 0 | 0 | 0 | 0 |
| Talc | 0 | 0 | 0 | 0 | 0 | 0 | 0 | 0 | 0 | 0 | 0 | 0 |
| Crystaline Silica | 10 | 0 | 0 | 0 | 0 | 0 | 0 | 5 | 8.1 | 8.1 | 8.33 | 0 |
| Amorphous Silica | 0 | 0 | 0 | 0 | 0 | 0 | 0 | 0 | 0 | 0 | 0 | 0 |
| Wollastonite | 5 | 0 | 0 | 0 | 0 | 0 | 0 | 10 | 8.1 | 8.1 | 8.33 | 0 |
| Chitin | 0 | 0 | 0 | 0 | 0 | 0 | 0 | 10 | 8.1 | 8.1 | 8.33 | 0 |
| PEO | 0 | 0 | 0 | 0 | 0 | 0 | 0 | 0 | 0 | 0 | 0 | 0 |
| PEG | 0 | 0 | 0 | 0 | 0 | 0 | 0 | 0 | 0 | 0 | 0 | 0 |
| Total Dry Mix | 97.60 | 97.20 | 97.20 | 97.20 | 97.20 | 97.20 | 97.20 | 98.25 | 98.25 | 98.25 | 98.25 | 97.40 |
| Modulus (Mpa) | 1120 | 311 | 449 | 869 | 922 | 669 | 247 | 1817 | 2844 | 2250 | 2634 | 29 |
| Elongation (%) | 7.62 | 151 | 136 | 75 | 119 | 108 | 177 | 5.87 | 6.58 | 8.67 | 9.79 | 166.73 |

| | Example No | | | | | | | | |
|---|---|---|---|---|---|---|---|---|---|
| Dry weight | 25 % | 26 % | 27 % | 28 % | 29 % | 30 % | 31 % | 32 % | 33 % |
| Starch | 53.40 | 46.00 | 56.40 | 35.70 | 46.00 | 46.00 | 35.70 | 42.40 | 63.95 |
| Glycerol | 6 | 4 | 6 | 3 | 4 | 4 | 3 | 3.5 | 5 |
| Sorbitol | 8 | 6 | 8 | 4.2 | 6 | 6 | 4.2 | 4.9 | 11.71 |
| Maltitol | 6 | 4 | 6 | 3 | 4 | 4 | 3 | 3.5 | 3.29 |
| Mannitol | 0 | 0 | 0 | 0 | 0 | 0 | 0 | 0 | |
| Xylitol | 8 | 4 | 8 | 3 | 4 | 4 | 3 | 3.5 | |
| Erythritol | 7 | 2 | 7 | 1.8 | 2 | 2 | 1.8 | 2.1 | |
| PVOH | 6 | 6.4 | 6 | 4.2 | 6.4 | 6.4 | 4.2 | 4.9 | 12.54 |
| EnPol | 0 | 0 | 0 | 40 | 0 | 0 | 40 | 30 | |
| Woodflour | 0 | 0 | 0 | 0 | 0 | 0 | 0 | 0 | |
| Talc | 0 | 0 | 0 | 0 | 0 | 0 | 0 | 0 | |
| Crystaline Silica | 0 | 10 | 0 | 0 | 10 | 10 | 0 | 0 | |
| Amorphous Silica | 0 | 0 | 0 | 0 | 0 | 0 | 0 | 0 | |
| Wollastonite | 0 | 15 | 0 | 0 | 15 | 15 | 0 | 0 | |
| Chitin | 0 | 0 | 0 | 0 | 0 | 0 | 0 | 0 | |
| PEO | 0 | 0 | 0 | 0 | 0 | 0 | 0 | 0 | 0.68 |
| PEG | 0 | 0 | 0 | 0 | 0 | 0 | 0 | 0 | 0.26 |
| Total Dry Mix | 94.40 | 97.40 | 97.40 | 94.90 | 97.40 | 97.40 | 94.90 | 94.80 | 96.49 |
| Modulus (Mpa) | 178 | 1980 | 126 | 288 | 868 | 3181 | 311 | 465 | |
| Elongation (%) | 94.00 | 10.50 | 96 | 2.11 | 26.60 | 16.00 | 2.5 | 1.176 | |

To measure the mechanical properties of certain of the examples, the following properties were measured.

1. Low Youngs Modulus

The stiffness of the material may be manipulated with the level and composition of polyol plasticiser, filler and copolymer and may range from 30 MPa to greater than 3000 MPa. This makes these grades suitable for a wide range of injection moulding applications.

2. Strain at Break (>30%)

The extensional behaviour of the material may be manipulated with the level of plasticiser and may range from less than 2% minimum to in excess of 210%. This makes these grades suitable for a wide range of injection moulding applications.

Figure 1:
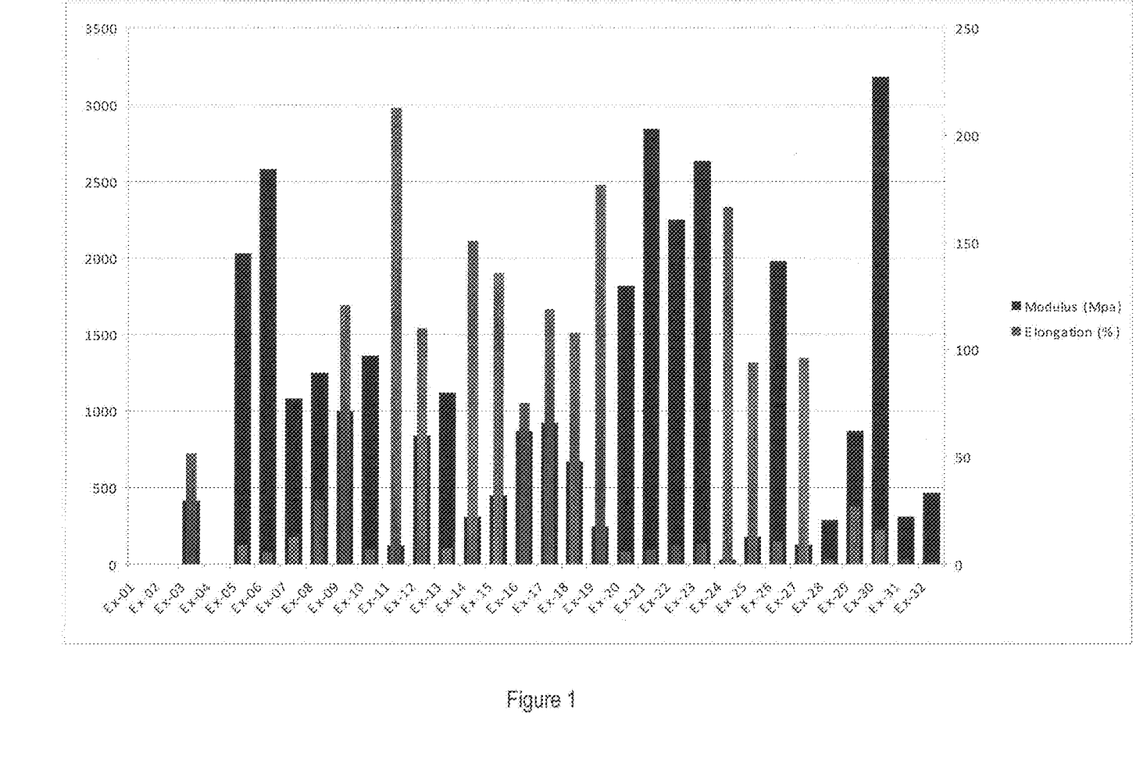
FIG. 1 illustrates mechanical properties of polymers formed from the compositions described as a function of the combination of plasticizer, filler and copolymer.
Figure 2:
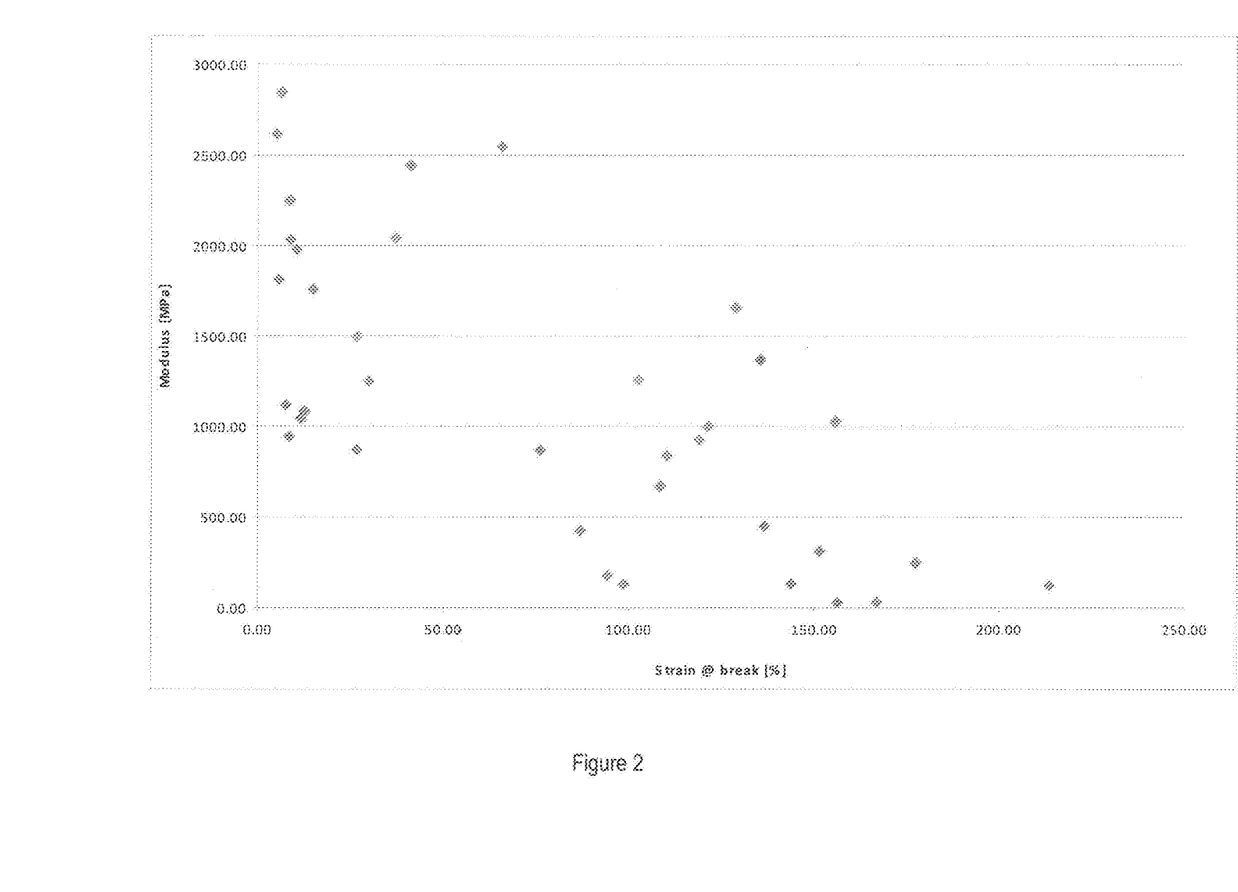
FIG. 2 plots the mechanical properties modulus and strain at break against each other for certain compositions described.

These properties are graphed in FIG. 1. FIG. 2 plots strain at break against modulus.

The combination of low Young's modulus, high elongation at break, suitable tensile strength, biocompatibility, biodegradability, water solubility and injection mouldability make these formulations ideally suitable for a variety of applications From the above description and examples it can be seen that there is provided a biodegradable starch composition that is comparable in price and performance characteristics to conventional non-biodegradable injection mouldable resins.

Those skilled in the art will realize that the injection moulding compositions described can be used for various applications by tailoring the specific composition content to the desired properties of the product. The composition may be used to mould medical or food associated products, including tampon applicators, stems for cotton buds, urine collection aids, cutlery, scoops and spatulas where flushability and biodegradability are desirable. These properties also make the composition useful in products which currently represent a litter or waste management problem including toilet roll cores, toilet brush heads, clips and ties used in packaging, oesophagus clips used in meat processing, temporary sewer plugs in buildings, inert ammunition simulators and mosquito control buckets.

Those skilled in the art will appreciate that this invention may be implemented in a variety of ways without departing from the essential teachings of the invention.

The invention claimed is:

1. A biodegradable injection mouldable polymer composition including on a dry weight basis:
    a) from 35.7-42.4% w/w by weight of a starch and/or a modified high amylose starch,
    b) from 4.2-4.9% w/w by weight of a water soluble polymer,
    c) from 15-17.5% w/w by weight of three or more polyol plasticizers having a molecular weight in the range of 50-6000,
wherein the composition includes 30-40% w/w polyester grafted or ungrafted to the starch backbone.

2. A composition as claimed in claim 1 further comprising 0.5-60% w/w filler.

3. A composition as claimed in claim 2 wherein the filler is an inorganic filler.

4. The composition of claim 2, wherein said filler is silica, talc, chitin, wollastonite, glass fiber, or nanoparticles.

5. A composition as claimed in claim 2, wherein the composition comprises 20-50% w/w filler.

6. A composition as claimed in claim 1 also including on a dry basis 0.1-5.0% w/w of one or more C12-22 fatty acids or salts.

7. A composition as claimed in claim 1 including 0.2-3.0% w/w emulsifier having a hydrophilic lipophilic balance (HLB) value between 1 and 22.

8. A composition of claim 1 wherein the composition is soluble in water.

9. The composition of claim 1, wherein said water soluble polymer is polyvinyl alcohol, polyvinyl acetate, or copolymers of ethylene and vinyl alcohol which have a melting point compatible with the molten state of the starch components.

10. The composition of claim 1, wherein said molecular weight is 50-2500.

11. The composition of claim 1, wherein said molecular weight is 100-400.

12. The composition of claim 1, wherein said three or more polyol plasticizers are at least three of sorbitol, glycerol, maltitol, xylitol, mannitol, erythritol, polyglycerol, glycerol trioleate, tributyl citrate, acetyl tri-ethyl citrate, glyceryl triacetate, 2,2,4-trimethyl-1,3-pentanediol diisobutyrate, polyethylene oxide, ethylene glycol, diethylene glycol or polyethylene glycol.

13. The composition of claim 1, wherein said three or more polyol plasticizers are at least three of glycerol, maltitol, sorbitol, erythritol, or xylitol.

14. A composition as claimed in claim 1, wherein the polyester is polyisobutylene adipate-co-terephthalate or polybutylene adipate succinate.

15. An injection moulded product formed from a resin composition including on a dry weight basis:
   a) from 35.7-42.4% w/w by weight of a starch and/or a modified high amylose starch,
   b) from 4.2-4.9% w/w by weight of a water soluble polymer,
   c) from 15-17.5% w/w by weight of three or more polyol plasticizers having a molecular weight in the range of 50-6000,
wherein the composition includes 30-40% w/w polyester grafted or ungrafted to the starch backbone.

16. The composition of claim 15, wherein said water soluble polymer is polyvinyl alcohol, polyvinyl acetate, or copolymers of ethylene and vinyl alcohol which have a melting point compatible with the molten state of the starch components.

17. The composition of claim 15, wherein said molecular weight is 50-2500.

18. The composition of claim 15, wherein said molecular weight is 100-400.

19. The composition of claim 15, wherein said three or more polyol plasticizers are at least three of sorbitol, glycerol, maltitol, xylitol, mannitol, erythritol, polyglycerol, glycerol trioleate, tributyl citrate, acetyl tri-ethyl citrate, glyceryl triacetate, 2,2,4-trimethyl-1,3-pentanediol diisobutyrate, polyethylene oxide, ethylene glycol, diethylene glycol, or polyethylene glycol.

20. The composition of claim 15, wherein said three or more polyol plasticizers are at least three of glycerol, maltitol, sorbitol, erythritol, or xylitol.

21. The injection moulded product of claim 15, wherein the polyester is polyisobutylene adipate-co-terephthalate or polybutylene adipate succinate.

22. An injection moulded product formed from a resin composition soluble in water including on a dry weight basis:
   a) from 35.7-42.4% w/w by weight of a starch and/or a modified high amylose starch,
   b) from 4.2-4.9% w/w by weight of a water soluble polymer,
   c) from 15-17.5% w/w by weight of three or more polyol plasticizers having a molecular weight in the range of 50-6000,
wherein the composition includes 30-40% w/w polyester grafted or ungrafted to the starch backbone.

23. The injection moulded product of claim 22 wherein at least part of the product is coated with a water resistant coating.

24. The injection moulded product of claim 23 wherein the water resistant coating is shellac, biodegradable polyesters or PLA solutions.

25. The composition of claim 22, wherein said water soluble polymer is polyvinyl alcohol, polyvinyl acetate, or copolymers of ethylene and vinyl alcohol which have a melting point compatible with the molten state of the starch components.

26. The composition of claim 22, wherein said molecular weight is 50-2500.

27. The composition of claim 22, wherein said molecular weight is 100-400.

28. The composition of claim 22, wherein said three or more polyol plasticizers are at least three of sorbitol, glycerol, maltitol, xylitol, mannitol, erythritol, polyglycerol, glycerol trioleate, tributyl citrate, acetyl tri-ethyl citrate, glyceryl triacetate, 2,2,4-trimethyl-1,3-pentanediol diisobutyrate, polyethylene oxide, ethylene glycol, diethylene glycol, or polyethylene glycol.

29. The composition of claim 22, wherein said three or more polyol plasticizers are at least three of glycerol, maltitol, sorbitol, erythritol, or xylitol.

30. The injection moulded product of claim 22, wherein the polyester is polyisobutylene adipate-co-terephthalate or polybutylene adipate succinate.

\* \* \* \* \*